Patented Nov. 27, 1928.

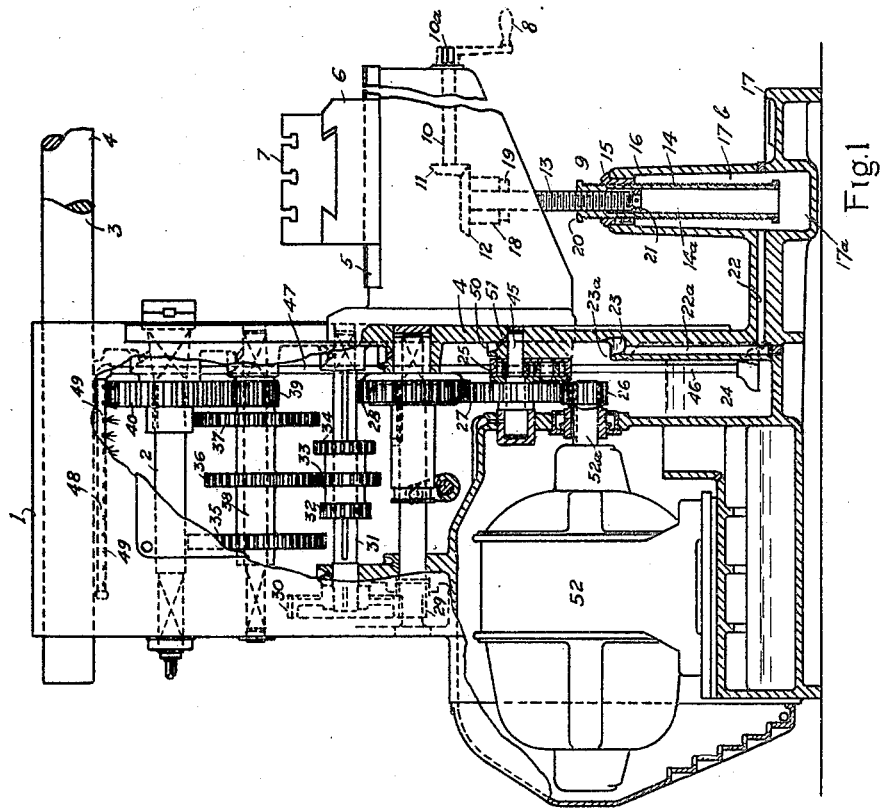

1,693,446

UNITED STATES PATENT OFFICE.

EDWARD J. KEARNEY, OF WAUWATOSA, WISCONSIN, ASSIGNOR TO KEARNEY & TRECKER CORPORATION, OF WEST ALLIS, WISCONSIN.

MACHINE-TOOL ORGANIZATION.

Application filed February 17, 1926. Serial No. 88,874.

This invention relates to a machine tool organization and more particularly to the lubrication of certain portions of the mechanism of a machine tool.

It is a principal object of the invention to improve the lubrication of the elevating screw of a machine tool.

A further purpose is to provide for and insure thorough lubrication of the elevating screw and its nut, without attention or care on the part of the operator.

The invention consists in certain novel features of construction and in the novel arrangement and combination of parts as hereinafter particularly described and claimed.

In the accompanying drawings like reference characters are used to designate the same parts in each view.

Fig. 1 is an elevation partly in section along line 1—1 of Fig. 2 of a machine tool of the type commonly known as a horizontal knee type milling machine, the view being taken from the left.

Fig. 2 is a rear elevation of the machine shown in Fig. 1.

A column 1 of hollow box like form rotatably supports a tool spindle 2 and is provided with a plurality of horizontally slidable overarms 3 and 4. Slidably guided for vertical movement on the front wall 4 of the column 1 is a support or knee 5 which slidably supports and guides a saddle 6, upon which a table 7 is movable, the slidable knee, saddle and table together providing for movement of work supported on table 7 in three transverse directions relative to tool spindle 2.

The support 5 is vertically movable by the means of a hand crank 8, which is connected for the operation of a telescopic elevating screw generally denoted by the numeral 9, through the shaft 10, which is squared at 10ª to receive the crank, a bevel gear 11 fixed on the end of shaft 10, and bevel gear 12 fixed on the upper end of the inner member 13 of the telescopic screw 9. The inner member 13 of the telescopic screw is in threaded engagement with an outer member 14 which in turn is in threaded engagement with a nut 15 fixed in an upwardly projecting stump portion 16 of the forwardly projecting base portion 17 of column 1. The screw 13 is rotatable in the bearing 18 formed in knee 5 and is prevented from axial movement relative to the knee 5 by gear 12 in the one direction and by a collar 19 fixed on the screw to prevent movement in the other direction. When rotated from the crank 8 the screw 13 being of smaller diameter than the screw 14 will ordinarily revolve inside without movement of the screw 14 until the limit of movement of the screw 13 in screw 14 has been reached. In the one direction this is determined by the striking of the screw portion 20 against collar 19 and in the other direction limit movement is determined by a striking of the collar 21 fixed on end of screw 13 against bottom of the counterbored hole 14ª in the screw 14. When screw 13 reaches its limit of movement the screw 14 will then revolve and permit additional movement of the knee 5 up to the combined limits of movement both at the screw 13 and the screw 14.

By the means of the telescopic screw construction, there is provided a considerable vertical movement of the support 5 without the necessity of providing an opening in the base portion 17ª underneath the screw 14. The walls of the stump 16 are extended upwardly to form with the bottom wall portion 17ª a substantially closed chamber 17ᵇ.

The chamber 17ᵇ is filled with lubricant to a height sufficient that the lubricant reaches the threads of the nut 15.

It is obvious that as the support is moved downwardly portions both of screw 14 and screw 13 will project within chamber 17ᵇ and unless means are taken to prevent such a result the lubricant contained within the chamber would be forced out along the screw and nut and overflow the top face and exterior wall of stump 16 to be wasted with no means of replacement. To avoid this a channel is provided consisting of passage 22 and 22ª communicating with the interior of the box like column, the channel 22ª terminating in a pocket or supplementary reservoir 23 which is upwardly open in the interior of the column and is provided with a lip or overflow portion 23ª located in a horizontal plane a trifle below the horizontal plane of the top surface of the stump 16.

Thus as the screws 14 and 13 move into the chamber 17ᵇ, the lubricant thus displaced, or an equivalent volume will overflow the lip 23ª before it rises to a level sufficient to overflow the top of the stump 16.

The reservoir portion 23 may be and preferably is made of considerable area relative to the space occupied by screws 13 and 14 within chamber 17ᵇ when the screws 13 and 14 are in the extreme down position and the fluctuation of the oil level within the reservoir 23 as the screws move up or down is thereby maintained within such narrow limits that the change in oil level caused by screw movement never rises above the lip 23ª nor falls below the lower face of the nut 15 which it is desired to lubricate together with screws 13 and 14.

To automatically replenish the quantity of lubricant and maintain the level at all times of sufficient height to reach nut 15, the column 1 is provided with a lubricant reservoir 24 at a structure level substantially lower than the pocket 23. Means are provided for continuously elevating oil from the reservoir 24 to the pocket 23, the surplus lubricant overflowing lip 23ª and returning again to the reservoir. In the present embodiment it is preferred to utilize for this purpose the lubricating system provided for the mechanism housed within column 1, which will now be described. The spindle 2 is actuated by means of a power train consisting of gears 26, 27, 28, 29, 30, which drive a shaft 31 by means of power supplied, in this instance from a motor 52, upon the shaft 52ª of which the gear 26 is fixed, the various gears being provided with suitable shafts and bearings for their support from the column 1. Slidably keyed on shaft 31 are gears 32, 33 and 34 which may be engaged one at a time respectively with the gears 35, 36, and 37 fixed on a shaft 38. The gear pairs 32—35, 33—36, 34—37, are of different ratio and as the gears of the different pairs are engaged to drive the shaft 38, transmit different speeds thereto, thus providing a speed change mechanism, the effect of which is transmitted to the spindle 2 by means of a gear 39 fixed on shaft 38 and gear 40 fixed on spindle. The gears 32, 33, and 34 are fixed together for simultaneous movement by means of hand lever 41 fixed on shaft 42 pivoted in the wall of column 1 and having an inner level 43 fixed thereon and provided with a pivoted fork 44 engaging the sides of the gear 33. A pump 25 is fixed on the front wall 4 of the column in such position that the shaft 45 upon which gear 27 is fixed provides a drive shaft for the pump which may be of any suitable type, being in this instance a pump of the well known enclosed gear type. A suction pipe 46 extends downwardly from the suction port of the pump into the lubricant within the reservoir 24, and a pipe 47 extends upwardly from the exhaust or pressure port of the pump to a header 48 provided with perforations or openings 49 from which lubricant delivered by pump 25 is sprayed out over the gearing and shafts in the interior of the column and over the interior of the column walls, the gears in their rotation being of material assistance in filling the interior of the chamber with flying drops of oil. Pockets are provided associated with the column walls for each of the various shaft bearings, the pocket 50 being typical. The pockets communicate with the bearings by the means of channels such as the channel 51 associated with the pocket 50. The pocket 23 being at a lower level of the structure and underneath a number of the pockets and bearings provided for the upper shafts will receive lubricant, not only directly from the header 48 but likewise lubricant which flows down the front wall 4 including lubricant which has been collected by the various pockets such as pocket 50 and has passed through the various bearings associated with the pockets in its return to the lower level of the structure.

It will thus be seen that the level of the lubricant within the chamber 17ᵇ and the reservoir 23 will at all times be maintained and although it may momentarily during the upward movement of the screw 9 be lowered somewhat below the lip 23ª in the reservoir 23, yet it will never fall below the bottom face of nut 14, and if the support 5 is permitted to remain in an up position, the lubricant level will soon be reestablished by means of pump 25, to again overflow lip 23ª. During any subsequent downward movement of the screw 9 lubricant within the chamber 17ᵇ will be forced out of the space occupied by screws 13 and 14 in their downward movement, to overflow the lip 23ª before it rises to a height sufficient to overflow the top face of the stump 16.

Thus chamber 17ᵇ will be continuously replenished and will always be full of lubricant to lubricate screws 13 and 14 and nut 15.

Having now fully disclosed my invention in one of its preferred embodiments, I claim:

1. In a machine tool, the combination of a hollow column, a knee vertically movable thereon, an elevating screw projecting downwardly from said knee, a nut in threaded engagement with said screw and fixed with said column and means for lubricating said nut including a lubricant channel communicating with the interior of said hollow column.

2. In a machine tool, the combination of a hollow column including an upwardly projecting stump portion forming a lubricant chamber, a support vertically slidable relative to said column, an elevating screw projecting downwardly from said support and into said chamber, and means for preventing lubricant from overflowing the top face of said stump when said screw is moved downwardly including a lubricant passage communicating at the one end with the interior of said hollow column and at the other end with said chamber.

3. In a machine tool the combination of a hollow column including an upwardly projecting stump portion forming a lubricant chamber, a support vertically slidable relative to said column above said stump, an elevating screw projecting downwardly from said support and into said chamber, and means for maintaining substantially a constant level of lubricant within said chamber including a lubricant pocket within said column and a lubricant passage comunicating between said pocket and said chamber.

4. In a machine tool the combination of a hollow column including an upwardly projecting stump portion forming a lubricant chamber, a support vertically slidable on said column above said stump, an elevating screw projecting downwardly from said support and into said chamber, an upwardly open pocket within said hollow column, a lubricant channel communicating between said pocket and said chamber, and means for supplying lubricant to said chamber including a reservoir within said column at a level below said pocket, and a pump adapted to elevate lubricant from said reservoir to said pocket.

5. In a machine tool, the combination of a hollow column, an upwardly projecting stump portion fixed therewith and forming a lubricant chamber, a support vertically slidable relative to said column, an elevating screw projecting downwardly from said support and into said chamber, and means for replenishing lubricant within said chamber including a reservoir in a lower level of said column and a pump adapted to elevate lubricant from said reservoir.

6. In a machine tool the combination of a hollow column including an upwardly projecting stump portion forming a chamber for retaining lubricant, a support vertically slidable relative to said column above said stump, an elevating screw projecting downwardly from said support into said chamber, a power train including gearing and shafts therefor having bearings, a pocket within said column and communicating with said chamber, a lubricant reservoir at a lower level of said column, and means for supplying lubricant from said reservoir both to some of said bearings and to said pocket including a pump adapted to elevate lubricant from said reservoir.

7. In a machine tool the combination of a hollow column, a lubricant chamber fixed therewith, a support vertically slidable relative to said column above said chamber, an elevating screw projecting downward from said support and into said chamber, an open lubricant pocket within said column having an overflow lip substantially below the overflow level of said chamber, and a closed lubricant passage communicating betwen said pocket and said chamber.

8. In a milling machine the combination of a hollow column, an upwardly projecting stump portion fixed therewith, a bottom plate associated with said stump portion whereby a lubricant chamber is formed within said stump, a knee vertically slidable on said column, and a screw projecting downwardly from said knee and into the lubricant within said chamber; said screw having an upper portion fixed against axial movement relative to said knee, and a lower portion threaded on said upper portion to be axially movable relative thereto, whereby in the continued downward movement of said knee the screw is prevented from projecting into the space reserved for said bottom plate.

9. In a milling machine the combination of a hollow column, a stump portion fixed therewith forming a lubricant chamber, a support vertically movable above said chamber, a screw projecting downwardly from said support and into said chamber, a pocket within said hollow column forming a supplementary reservoir, and a passage communicating at the one end with said chamber and at the other end with said supplementary reservoir.

10. In a machine tool, the combination of a column, a knee vertically movable thereon, an elevating screw projecting downwardly from said knee, a nut engaging said screw and fixed with said column, a lubricant reservoir associated with said nut and adapted to receive said screw in the downward movement of said knee, and a supplementary reservoir associated with said column and communicating with the nut reservoir.

In witness whereof I hereto affix my signature.

EDWARD J. KEARNEY.